Nov. 15, 1960
K. R. ALLEN
2,959,812
MULTIWALL CONTAINERS
Filed Dec. 2, 1957
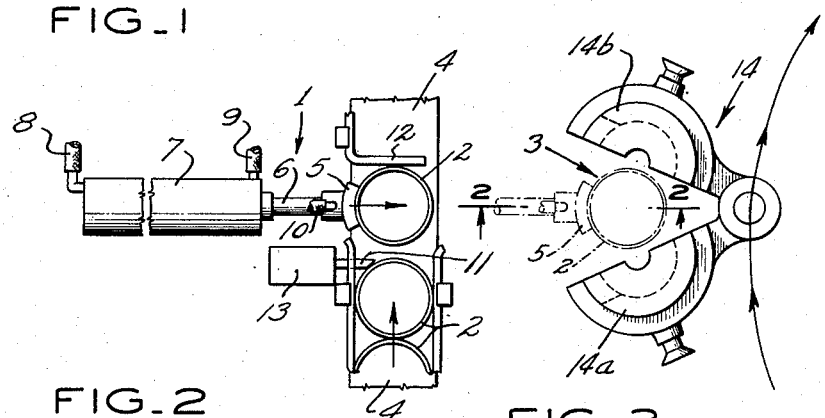
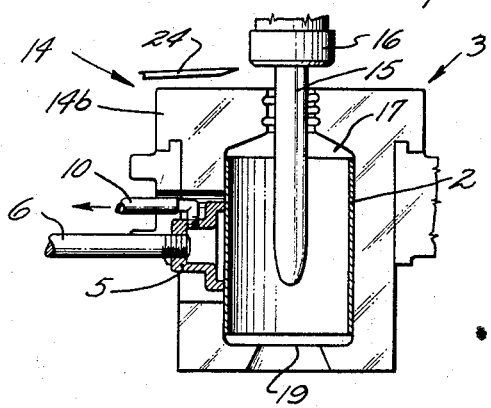
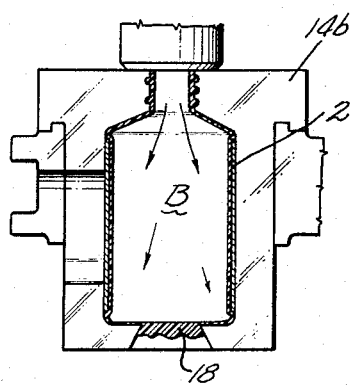
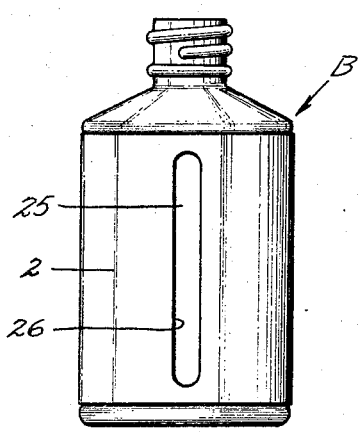
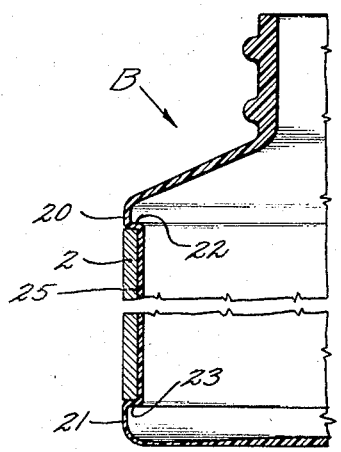
INVENTOR
KENNETH R. ALLEN
BY *Bates & Willard*
ATTORNEYS

United States Patent Office 2,959,812
Patented Nov. 15, 1960

2,959,812

MULTIWALL CONTAINERS

Kenneth R. Allen, Taylorville, Ill., assignor to Plax Corporation, Bloomfield, Conn., a corporation of Delaware Filed Dec. 2, 1957, Ser. No. 700,034

2 Claims. (Cl. 18—5)

The present invention relates to bottles and the like blow molded of thermoplastic material and more particularly to light weight bottles combined with a reinforcing cylindrical support for the body of the container formed in whole or in part of the same or another material.

Reinforced containers embodying the invention have advantages in strength, economy and efficiency. As an example, a container provided with a thin plastic side wall supported by a cardboard reinforcing sleeve may be stronger and more economical than a conventional plastic bottle formed entirely of a substantially greater amount of plastic.

Another object is to provide a novel multi-wall container having improved vapor barrier properties and one which is readily printed, labeled, or otherwise decorated.

In addition to providing improved containers, it is a further object of the invention to provide novel process and apparatus for forming them.

Other objects and advantages of the invention are pointed out in the detailed description which follows and which has reference to the accompanying drawing in which:

Fig. 1 is a partly schematic top plan view of apparatus for automatically presenting reinforcing cylinders successively to a molding station and for blowing bottles in the cylinders in accordance with the present invention;

Fig. 2 is an enlarged cross sectional view taken generally on line 2—2 of Fig. 1 showing plastic tubing extruded into the reinforcing cylinder preliminary to closing the mold and blow molding a reinforced plastic bottle therein;

Fig. 3 is a view, similar to Fig. 2, showing the blown and reinforced bottle in the blow mold;

Fig. 4 is an enlarged elevation view of the reinforced bottle; and

Fig. 5 is a further enlarged view in cross-section and partly broken away of the bottle wall.

Referring to the drawings, and particularly to Fig. 1 thereof, there is shown mechanism generally designated 1 for automatically presenting a reinforcing cylinder 2 to a blow mold station, which is generally designated 3. In the illustrative embodiment shown in Fig. 1, the mechanism 1 includes a conveyor belt 4 on which the lead cylinders 2 are successively presented to a gripper 5. The gripper 5 is secured to piston rod 6 of a transfer piston motor 7 to which operating air is alternately supplied through lines 8 and 9 so as to advance and retract the gripper 5 between the positions shown in solid and phantom in Fig. 1.

Connected to the gripper 5 is a vacuum line 10 which communicates with a suitable source of vacuum through valving, not shown. The establishment of vacuum in the line 10 serves to secure the cylinder 2 to the gripper 5, as shown in Fig. 2, and relief of vacuum in the line 10 acts to release the cylinder from the gripper 5.

In order to present successive cylinders on the conveyor 4 to the gripper 5 a solenoid operated stop 11 or equivalent means is provided adjacent the gripper 5 in the path of the line of cylinders 2 on the belt 4 and a fixed stop 12 is provided in the path of the cylinders 2 on the belt 4 so as to restrain and position the forwardmost cylinder 2 on the belt directly in line with the grippers 5 and piston rod 6.

As shown in Fig. 1, the stop 11 checks the advance of the line of cylinders 2 on the advancing belt 4 until the solenoid 13 is actuated and retracts the stop 11 responsive to return of the gripper 5 from the phantom position to the solid line position shown in Fig. 1. Thereupon the line of cylinders 2 advance until the lead cylinder engages the stop 12 in position for gripping by the gripper 5. Vacuum is then established in the gripper 5 through the vacuum line 10 so as to firmly grip the lead cylinder 2 to the gripper whereupon the piston motor 7 is advanced by operating air in line 8 so as to position the gripper 5 and cylinder 2 in the phantom position shown in Fig. 1. Concurrently, the solenoid 13 is actuated to advance the stop 11 and cam the line of cylinders 2 back to the position shown in Fig. 1 and out of engagement with the cylinder held by the gripper 5.

In accordance with the present invention, a blow mold, generally designated 14, is located at the blow mold station 3 and includes a plurality of split mold sections 14a and 14b which are opened to receive the cylinder 2. While only the single blow mold 14 is shown in the drawing, it is contemplated in practice that a plurality of such molds will be provided on a turret or other suitable conveyor means (not shown) to present the open blow molds successively to the blow mold station 3 to receive successive individual reinforcing cylinders 2.

In accordance with the present invention, a plastic preform is introduced into the reinforcing cylinder 2 at the station 3 for blow molding into engagement with the reinforcing cylinder 2 within the mold 14.

In the embodiment illustrated, the preform or parison is provided in the form of a plastic tube 15 which is extruded from an extrusion nozzle or die 16 into the cylinder 2 at the blow mold station 3. The tube 15 may be extruded downwardly as shown in Fig. 2 and when its lead end extends below the bottom of the mold cavity 17 the mold sections 14a and 14b may be closed so as to pinch the tube 15 closed, as at 18, between edges 19 of the mold sections 14a and 14b at the bottom of the mold cavity 17. Thereupon the plastic tubing 15 is blow molded, as shown in Fig. 3, against the reinforcing cylinder 2 within the mold cavity 17. Preferably, the portions 20 and 21 of the blown bottle above and below the cylinder 2 are blown outwardly into alignment with the outer surface of the cylinder 2 so that the portions 20 and 21 of the bottle wall to provide a substantially uninterrupted continuation of the cylinder 2 and shoulders 22 and 23 prevent longitudinal displacement of the reinforcing cylinder on the bottle.

The nozzle 16 is raised from the mold 14 and the plastic connection between the nozzle and mold is severed, as by a knife 24. Thereafter, the closed mold 14 may be moved to a cooling station at which a blowhead (not shown) may be employed to reestablish and maintain air pressure within the molded container B while the container is cooled and set in the shape imparted by the mold 14 and reinforcing cylinder 2.

It will be understood that when the bottle B has been blow molded within the mold 14, the piston motor 7 is operated to withdraw the gripper 5 to the position shown in solid line in Fig. 1 preparatory to gripping and presenting the next cylinder 2 to the blow molding station 3 and to blow molding the next reinforced bottle.

However, the vacuum arm 6 may be withdrawn from the position shown in phantom in Fig. 1 any time after vacuum is applied through grooves (not shown) in the mold halves to hold the cylinder 2 in position within the mold cavity 17 and before the mold 14 is moved to the cooling station. As an alternative, the mold 14 may be provided with a recess to hold the cylinder 2 in position after the gripper 5 is withdrawn and until the tube 15 is blow molded therein.

The cylinders 2 may be of cardboard, metal, or such other materials as may be best suited to reinforcing a particular bottle.

In some instances, it has been found particularly advantageous to precoat the interior of the cylinder 2 with an adhesive, or other material, which acts to firmly bond the cylinder to the plastic wall 25 which is blow molded thereagainst. When the tube 15 is formed of polyethylene, it has been found particularly advantageous to precoat the inner surface of the cylinder 2 with a thin film of polyethylene which when engaged by the hot plastic of the tube 15, as shown in Fig. 3, is heated and adheres strongly thereto.

If desired, the reinforcing cylinder 2 may be cut or otherwise formed to provide a slight aperture 26 through which the level of the contents within the bottle being made may be observed through the plastic wall 25. While the aperture 26 illustrated in Fig. 4 is of lesser height than the cylinder 2, the aperture may extend the entire length of the reinforcing member 2 in those instances where a suitable adhesive bond is effected between the reinforcement member 2 and the plastic wall 25.

In addition to providing inexpensive strengthening structure to a container utilizing a relatively thin plastic wall 25, the material of the reinforcement member 2 may be chosen to provide greater vapor barrier protection than the plastic and to render the container less permeable to loss of content.

The material used to precoat the sleeve 2 also may be chosen to improve the vapor barrier property of the reinforced container B.

While the material for the sleeve 2 has been described as differing from that of the plastic tube 15, both may be the same material as, for example, polyethylene with resulting advantages over blow molding the bottle solely from the tube 15. Greater strength can be obtained in the composite side wall while effecting a substantial savings in thickness of bottom, neck and shoulder walls which are subjected to less stretch in the blow molding operation.

If desired, a vapor barrier lining may be introduced between the inner and outer polyethylene walls by suitable precoating of the sleeve 2.

While illustrated as having a circular cross-section, it will be understood that the sleeve 2 is not thus limited and may take any of a variety of shapes of continuous and discontinuous cross-sections.

Moreover, the sleeve 2 may be preprinted or otherwise predecorated or labeled advantageously.

Various other changes may be made in details of construction of a reinforced container and of the apparatus and mode of operation employed in its manufacture without departing from the scope of the appended claims.

Having described the invention, I claim:

1. Apparatus for manufacturing reinforced hollow articles such as bottles comprising a multisection blow mold providing in its closed condition a mold cavity with an opening extending outwardly from said cavity at the juncture of the mold sections, transfer means including gripping means for moving a reinforcement member from a supply of reinforcement members exteriorly of said mold to position it within the mold cavity, means for introducing a hollow plastic preform within said member with said member positioned within said mold cavity, means for closing said multisection mold about said member and said preform with said transfer means extending outwardly through said opening and the reinforcement member disposed with a portion thereof covering said opening, and means for blowing said preform into permanent molded engagement with said member and into removable molded engagement with said mold.

2. Apparatus for manufacturing reinforced hollow articles such as bottles comprising a multisection blow mold providing in its closed condition a mold cavity with an opening extending outwardly from said cavity at the juncture of the mold sections, transfer means including gripping means for moving a reinforcement member from a supply of reinforcement members exteriorly of said mold to position it within the mold cavity, means for supplying successive reinforcement members to said gripping means for transfer in succession to said mold cavity in the production of a plurality of reinforced bottles, means for introducing a hollow plastic preform within said member with said member positioned within said mold cavity, means for closing said multisection mold about said member and said preform with said transfer means extending outwardly through said opening and the reinforcement member disposed with a portion thereof covering said opening, and means for blowing said preform into permanent molded engagement with said member and into removable molded engagement with said mold.

References Cited in the file of this patent

UNITED STATES PATENTS

| | | |
|---|---|---|
| 1,637,719 | Whitlock | Aug. 2, 1927 |
| 2,035,017 | Smith | Mar. 24, 1936 |
| 2,128,239 | Ferngren | Aug. 30, 1938 |
| 2,200,042 | Salz | May 7, 1940 |
| 2,632,202 | Haines | Mar. 24, 1953 |
| 2,657,431 | Slaughter | Nov. 3, 1953 |
| 2,707,161 | Stern | Apr. 26, 1955 |
| 2,724,672 | Rubin | Nov. 22, 1955 |
| 2,789,934 | Busbach | Apr. 23, 1957 |
| 2,792,593 | Hardgrove | May 21, 1957 |
| 2,805,787 | Sherman | Sept. 10, 1957 |
| 2,830,721 | Pinsky et al. | Apr. 15, 1958 |
| 2,853,737 | Harlow | Sept. 30, 1958 |

FOREIGN PATENTS

| | | |
|---|---|---|
| 474,542 | Canada | June 19, 1951 |
| 1,097,943 | France | Feb. 23, 1955 |
| 453,123 | Great Britain | Sept. 1, 1936 |